(12) United States Patent
Seto et al.

(10) Patent No.: US 9,932,763 B2
(45) Date of Patent: Apr. 3, 2018

(54) VEHICLE DOOR OPENING DEVICE

(71) Applicant: Mitsui Kinzoku Act Corporation, Yokohama-shi (JP)

(72) Inventors: Naoya Seto, Yokohama (JP); Hirotsugu Kinoshita, Niiza (JP); Shuntaro Kimura, Yokohama (JP); Hiroshi Ishigaki, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 0 days.

(21) Appl. No.: 14/771,545

(22) PCT Filed: Sep. 9, 2014

(86) PCT No.: PCT/JP2014/073788
§ 371 (c)(1),
(2) Date: Aug. 31, 2015

(87) PCT Pub. No.: WO2015/118715
PCT Pub. Date: Aug. 13, 2015

(65) Prior Publication Data
US 2016/0333626 A1    Nov. 17, 2016

(30) Foreign Application Priority Data
Feb. 7, 2014    (JP) .................................. 2014-022085

(51) Int. Cl.
*E05F 15/643*    (2015.01)
*B60J 5/06*    (2006.01)
(Continued)

(52) U.S. Cl.
CPC ............. *E05F 15/643* (2015.01); *B60J 5/047* (2013.01); *B60J 5/06* (2013.01); *E05D 15/0621* (2013.01);
(Continued)

(58) Field of Classification Search
CPC ...................................................... B60J 5/047
See application file for complete search history.

(56) References Cited

U.S. PATENT DOCUMENTS 8,225,552 B2 * 7/2012 Yokomori .................. B60J 5/06
296/155
9,151,098 B2 * 10/2015 Yamada .................... B60J 5/06
(Continued)

FOREIGN PATENT DOCUMENTS

JP    08-232538    9/1996
JP    2013-91962 A    5/2013
(Continued)

OTHER PUBLICATIONS

Machine translation of JP 2013181330 A.*

*Primary Examiner* — Katherine W Mitchell
*Assistant Examiner* — Marcus Menezes
(74) *Attorney, Agent, or Firm* — Skinner & Associates; Joel Skinner

(57) ABSTRACT

A vehicle door opening device opens and closes a door with a motor. In the vehicle door opening device, an opening reversible member on which an opening cable is wound is disposed on a top surface of a center guide rail, and a closing reversible member on which a closing cable is wound is disposed under a lower surface of the center guide rail. A moving member moves along the center guide rail and comprises a closing coupling portion to which the closing cable is coupled and an opening coupling portion to which the opening cable coupled. The closing cable moves along the lower surface of the center guide rail, and the opening cable moves along the top surface of the center guide rail.

4 Claims, 8 Drawing Sheets

(51) Int. Cl.
*E05F 15/646* (2015.01)
*B60J 5/04* (2006.01)
*E05D 15/06* (2006.01)

(52) U.S. Cl.
CPC ....... *E05F 15/646* (2015.01); *E05Y 2201/434* (2013.01); *E05Y 2201/684* (2013.01); *E05Y 2900/531* (2013.01)

(56) References Cited

U.S. PATENT DOCUMENTS

| 2004/0216383 | A1* | 11/2004 | Rogers, Jr. ............. | E05B 85/26 |
| | | | | 49/360 |
| 2004/0221510 | A1* | 11/2004 | Fukumoto ................ | B60J 5/06 |
| | | | | 49/360 |
| 2006/0113821 | A1* | 6/2006 | Yokomori ................ | B60J 5/06 |
| | | | | 296/155 |
| 2007/0108799 | A1* | 5/2007 | Yokomori ................ | B60J 5/06 |
| | | | | 296/155 |

FOREIGN PATENT DOCUMENTS

| JP | 2013-181330 | 9/2013 | | |
| JP | 2013181330 A | * 9/2013 | ............... | B60J 5/06 |

\* cited by examiner

VEHICLE DOOR OPENING DEVICE

BACKGROUND OF THE INVENTION

The present invention relates to a vehicle door opening device for opening and closing a vehicle door electrically.

For example, a vehicle door opening device in JP8-232538A comprises a longitudinal guide rail fixed to the side of a vehicle body; a moving member that can move along the guide rail to open and close a sliding door; a door opening/closing drive unit (door drive in JP8-232538A) comprising a motor; and an opening cable and a closing cable wound on and reeled off a rotary drum of the drive opening/closing drive unit. Each of the cables reeled off the rotary drum is connected to a cable coupling portion of the moving member while each of the cables is wound around each reversible pulley, whereby power of the motor is transmitted to the moving member via the opening cable or closing cable to enable the sliding door to open or close.

However, in the vehicle door opening device in JP8-232538A, the end of each of the cables is coupled to the cable coupling portion of the moving member such that the ends of the cables face each other, thereby increasing the width of the moving member along a moving direction. The width of the moving member is increased to affect stroke of the moving member and opening/closing stroke of the sliding door. Particularly, a coil spring for taking up the slack in each of the cables is disposed in the cable coupling portion, thereby further increasing the width of the moving member and greatly affecting the opening-closing stroke of the sliding door.

SUMMARY OF THE INVENTION

In view of the disadvantage in the prior art, it is an object of the invention to provide a vehicle door opening device that unlikely affects stroke of a moving member.

DETAILED DESCRIPTION OF PREFERRED EMBODIMENT

One embodiment of the present invention will be described with respect to the drawings. In the following description, the left in FIG. 1 and the bottom in FIG. 2 are deemed as the front of a vehicle, and the right in FIG. 1 and the top in FIG. 2 are deemed as the back of the vehicle.

Figure 1:
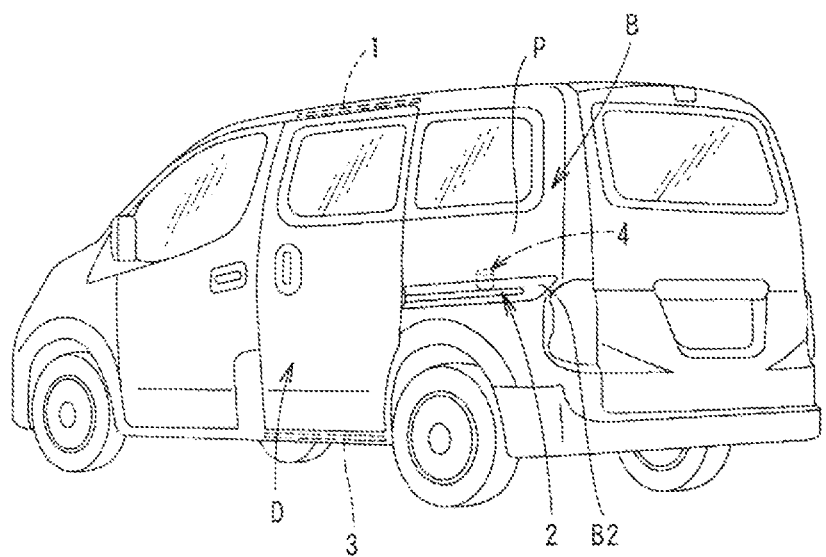
FIG. 1 is a perspective view of a vehicle including the present invention.

In FIG. 1, a sliding door (hereinafter called "door") in the vehicle is supported by an upper guide rail 1, a center guide rail 2 and a lower guide rail 3 fixed to the side of a vehicle body B and can slide longitudinally of the vehicle by electric force of a door-opening drive unit 4 (later described) mounted to the side of the vehicle body B from a fully-closed position where an entrance at the side of the vehicle body B closes to a fully-open position where the door moves backward along the side of the vehicle body B or the center guide rail 2 while the door slightly moves outward from the side of the vehicle body and vice versa. The top of the center guide rail 2 is covered with a finisher B2 fixed to the vehicle body B.

Figure 2:
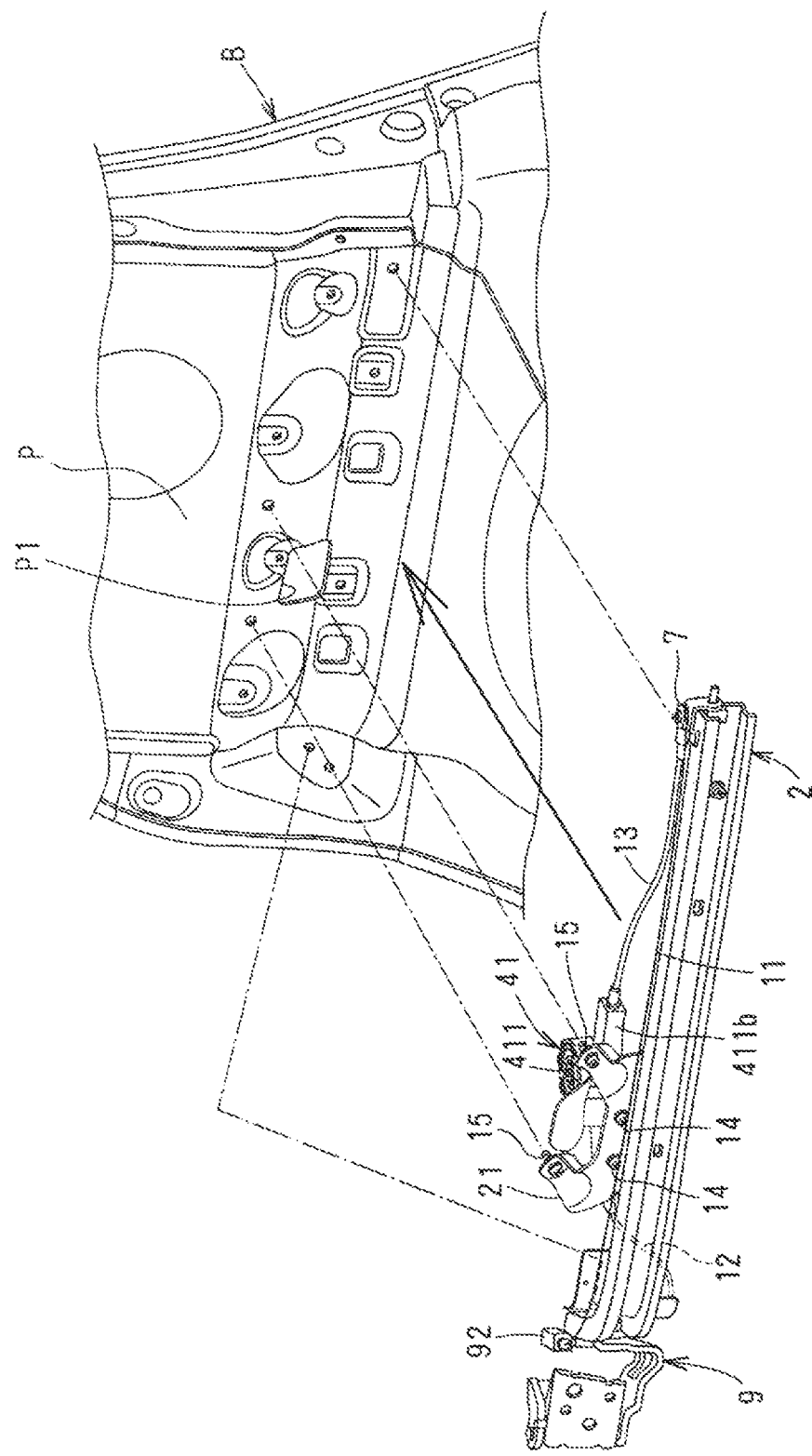
FIG. 2 is a perspective view of a rail module and the main part of a door.
Figure 3:
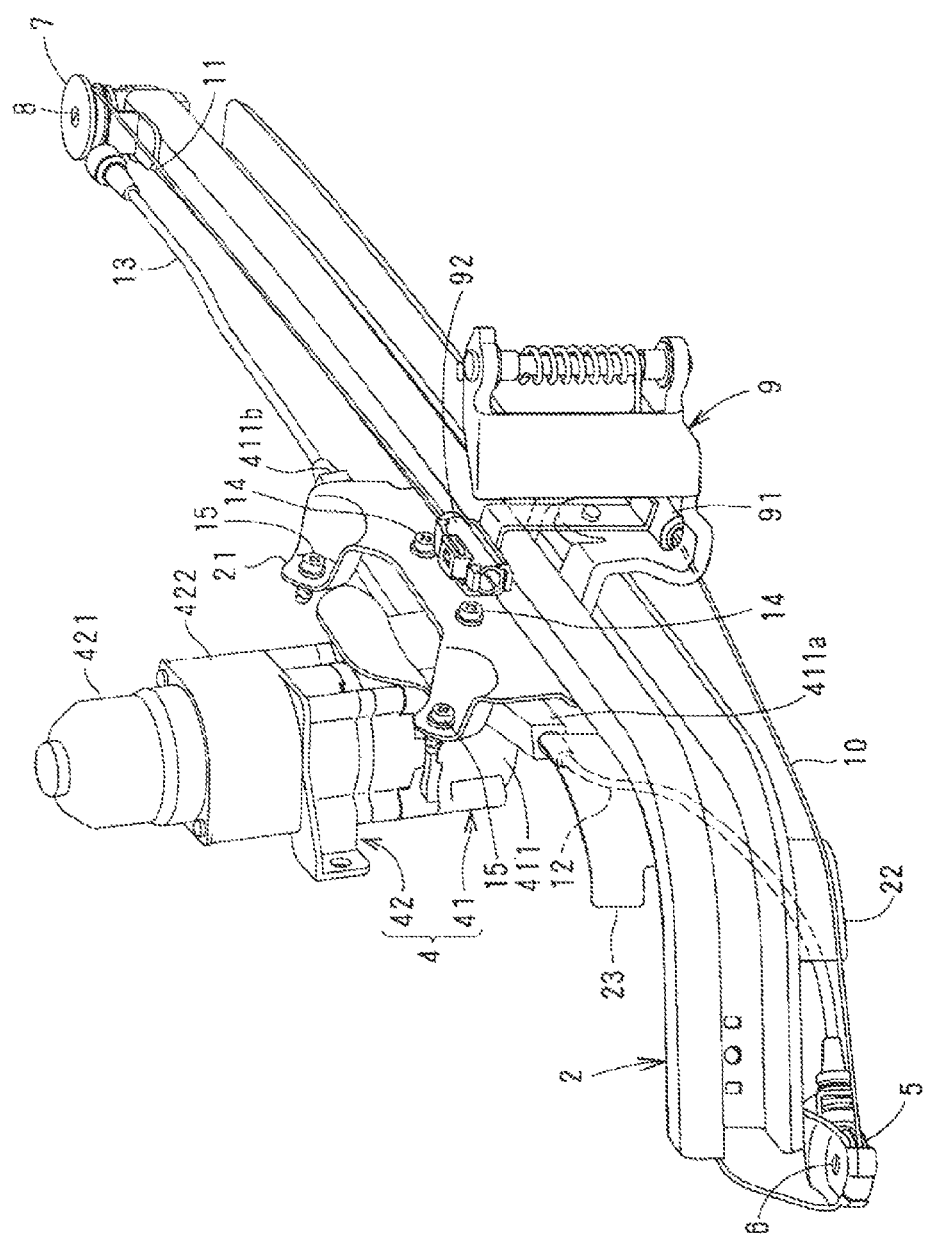
FIG. 3 is a perspective view of the rail module to which a drive portion is coupled.
Figure 4:
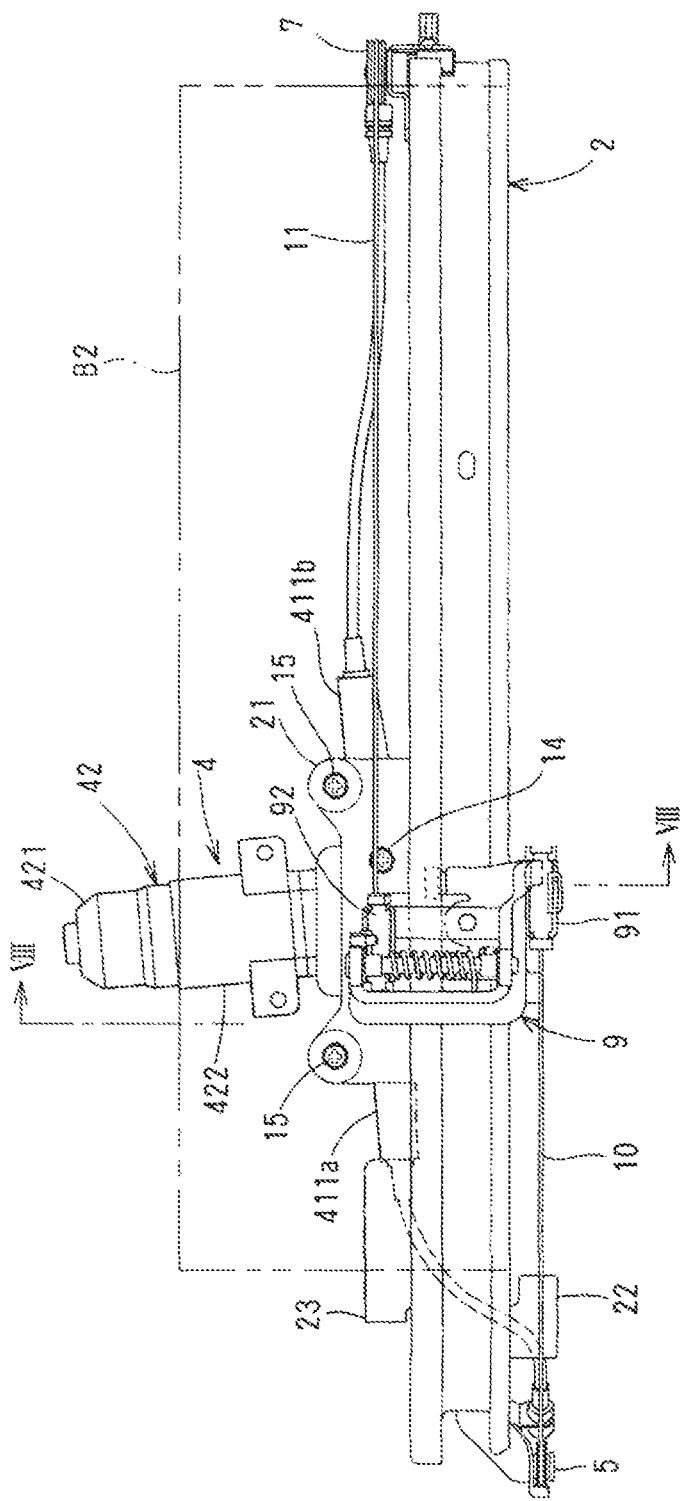
FIG. 4 is a front elevational view of the rail module viewed from the exterior of a vehicle.

In FIG. 2, in a panel P that forms the side of the vehicle body B, there is formed a rectangular opening P1 through which a driven portion 41 (later described) of the door-opening drive unit 4 can be introduced from the outside to the inside of the panel P. The opening P1 is formed in such size that the driven portion 41 of the door-opening drive unit 4 can be introduced from the outside to the inside.

In this embodiment, in order to keep the opening P1 to a minimum, as mentioned later, the driven portion 41 of the door-opening drive unit 4 can be attached from the outside of the vehicle, and a drive portion 42 (later described) of the door-opening drive unit 4 can be attached from the inside of the vehicle.

Figure 8:
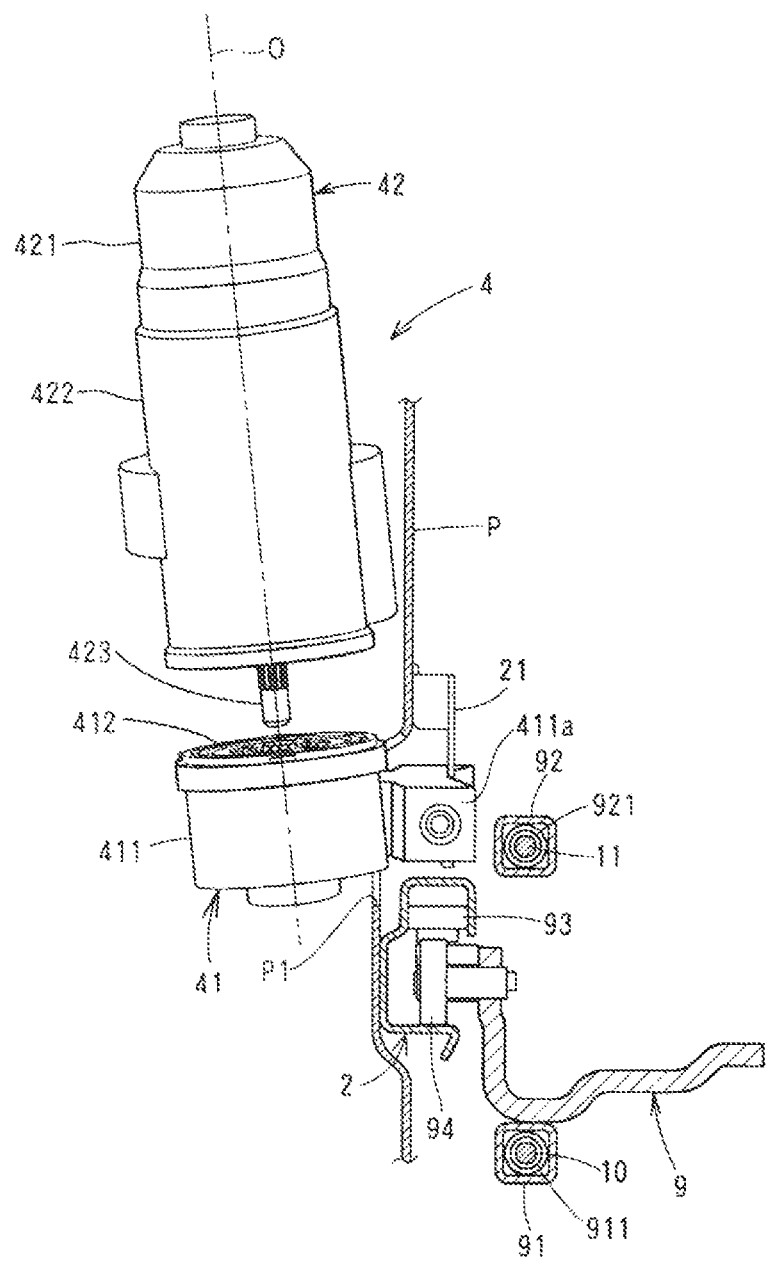
FIG. 8 is a vertical sectional view taken along the line VIII-VIII in FIG. 4.

In FIG. 8, the center guide rail 2 has a vertical cross-section like a channel and is fixed along a longitudinal direction of the vehicle.

In FIGS. 2 to 7, below the front of the center guide rail 2 curved toward the interior of the vehicle, a front reversible pulley 5 as a reversible closing member on which a closing cable 10 (later described) comprising a Bowden cable is wound is rotatably mounted via a vertical shaft 6, and on the upper surface of the rear of the center guide rail 2 extending backward straight, a reversible rear pulley 7 as a reversible opening member on which an opening cable 11 (later described) comprising a Bowden cable is wound is rotatably mounted via a vertical shaft 8. On lower part of the curved part of the center guide rail 2, a lower arcuate guide member 22 for guiding the closing cable 10 longitudinally in sliding contact therewith is fixed, and on the upper part, an upper arcuate guide member 23 for guiding the opening cable 11 longitudinally in sliding contact therewith is fixed.

The door D is connected to moving members (not shown) which move along the upper guide rail 1 and lower guide rail 3 longitudinally and to a moving member 9 which moves along the center guide rail 2 longitudinally and is supported on the vehicle body B to open and close longitudinally.

In FIG. 8, in the moving member 9, a roller 93 is rotatably mounted around a vertical shaft and a roller 94 is rotatably mounted around a horizontal shaft. The rollers 93, 94 roll in the center guide rail 2. So the moving member 9 can move along the center guide rail 2 between a fully-open position 9A at the front end of the center guide rail 2 and a fully-closed position at the rear end as shown by two-dotted lines in FIG. 6.

At the lower part of the moving member 9, there is provided a tubular closing coupling portion 91 coupled to the rear end of the closing cable 10 which is wound on the front reversible pulley 5 and extends backward. At the upper part of the moving member 9, there is provided a tubular opening coupling portion 92 connected to the front end of the opening cable 11 which is wound around the rear reversible pulley 7 and extends forward. The closing coupling portion 91 and opening coupling portion 92 are spaced from each other perpendicular to a moving direction of the moving member 9.

The closing coupling portion 91 and opening coupling portion 92 have tensioners 911 and 921 (FIG. 8) respectively, each comprising a coil spring which applies tension to the closing cable 10 and opening cable 11 and takes up the slack of the cables 10, 11.

In FIGS. 3 to 8, the door opening drive unit 4 comprises the driven portion 41 mounted to the panel P and the drive portion 42 coupled to the driven portion 41.

The driven portion 41 comprises an approximately cylindrical casing 411 fixed to the panel P with a bracket 21, and a rotary drum 412 which is rotatably mounted via a vertical shaft in the casing 411. In this embodiment, the casing 411 is fixed to the bracket 21 with two bolts 14, and the bracket 21 is fixed to the panel P with two bolts 15. However, the present invention is not limited to this embodiment, and the casing 411 may directly be fixed to the panel P without the bracket 21.

The casing 411 comprises a tubular body located in the panel P through the opening P1 of the panel P by fixing the casing 411 from the outside of the panel P with the bracket 21; an arm-like closing-cable outlet 411a for reeling off the closing cable 10 out of the panel P from the rotary drum 412; and an opening-cable outlet 411b for reeling off the opening cable 11 out of the panel P.

The rotary drum 412 is rotatably housed in the body of the casing 411 and disposed within the panel P. On the outer circumferential surface of the rotary drum 412, the closing cable 10 for transmitting power of the motor 421 of the drive portion 41 as door-closing force to the moving member 9 and the opening cable 11 for transmitting it as door-opening force are wound and reeled off.

Between the front end of the closing-cable outlet 411a and the lower surface of the front end of the center guide rail 2 close to the front reversible pulley 5, there is provided a flexible closing outer tube 12 through which the closing cable 10 runs. Between the rear end of the opening-cable outlet 411b and the upper surface of the rear end of the center guide rail 2 close to the rear reversible pulley, there is provided a flexible outer tube 13 through which the opening cable 11 runs.

The closing cable 10 which is reeled out of the rotary drum 412 runs through the closing-cable outlet 411a and the closing outer tube 12 and goes out of the outer tube 12 at the front end. The closing cable 10 is wound on the front reversible pulley 5, extended backward and connected to the closing coupling portion 91 of the moving member 9 to move longitudinally along the lower surface of the center guide rail 2. The opening cable 11 reeled out from the rotary drum 412 runs through the opening cable outlet 411b and the opening outer tube 13, and goes out of the outer tube 13 at the rear end. The opening cable 11 is wound around the rear reversible pulley 7, extended forward and coupled to the opening coupling portion 92 to move longitudinally along the upper surface of the center guide rail 2.

Figure 5:
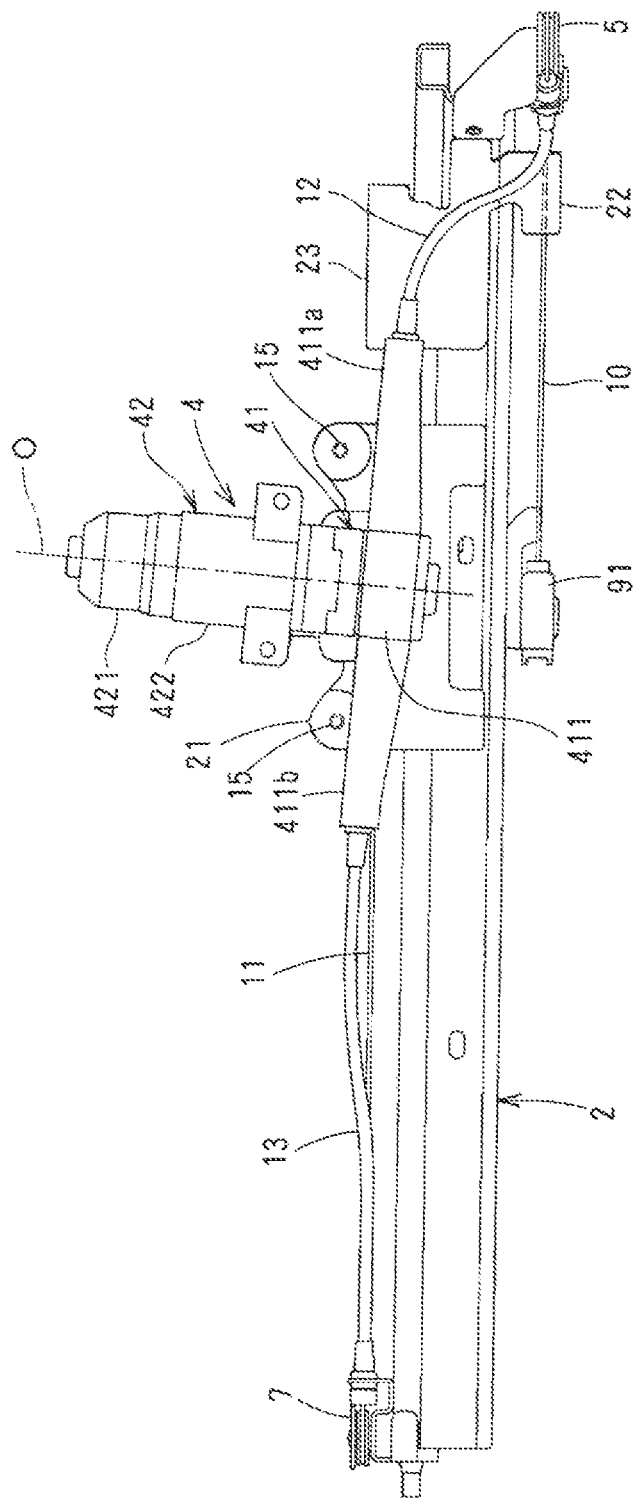
FIG. 5 is a rear elevational view of the rail module viewed from the interior of the vehicle.
Figure 6:
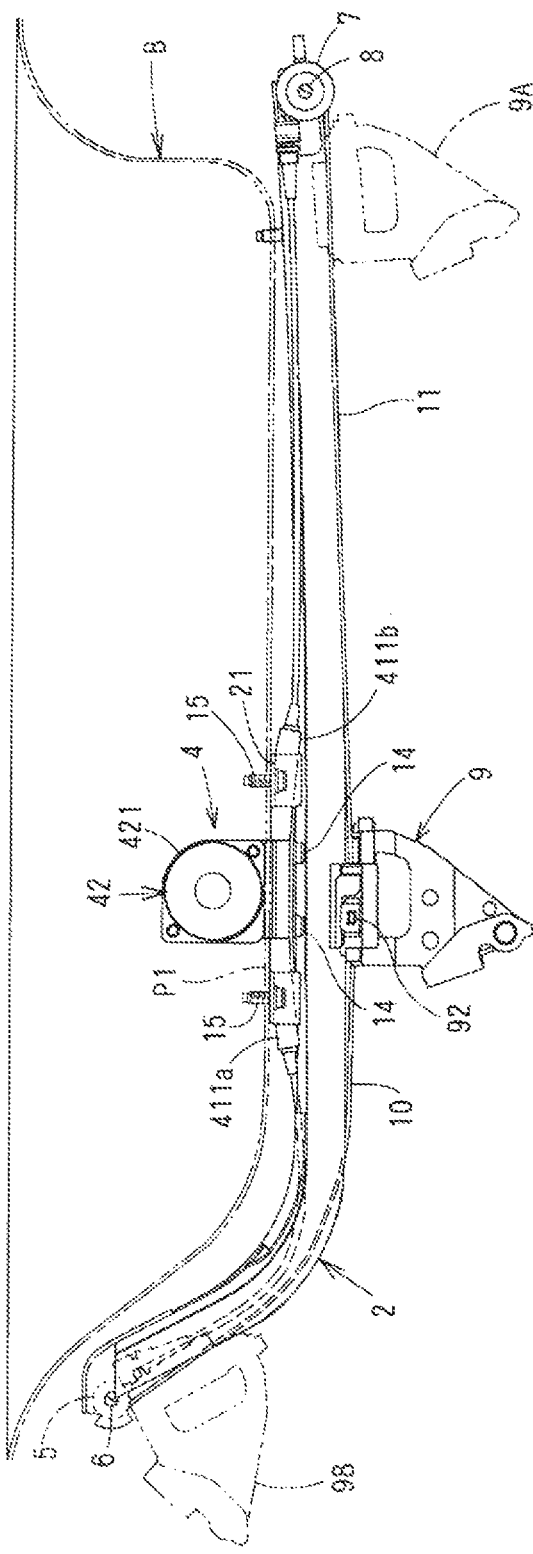
FIG. 6 is a lop plan view of the rail module.

The rotary drum 412 is rotatably mounted in the easing 411 via a rotary shaft (not shown) in which an axis O slightly tilts forward, (rightward in FIG. 5). Hence, in FIGS. 4 and 5, the closing-cable outlet 411a slightly tilts forward and downward longitudinally, and the opening-cable outlet 411b tilts backward and upward longitudinally. The closing cable 10 which is led from the front end of the closing-cable outlet 411a can be wound on the front reversible pulley 5 below the closing cable outlet 411a while the closing outer tube 12 is less bent. In FIG. 8, the axis O tilts toward the interior of the vehicle, (leftward in FIG. 8) Thus, while it keeps the driven portion 41 and drive portion 42 from projecting toward the interior of the vehicle, a gap between the panel P and drive portion 42 is kept enough thereby improving connectability of the drive portion 42.

The drive portion 42 comprises a motor 421 which has a rotary shaft on the axis O; an approximately cylindrical vertical casing 422 coupled to the lower end of the motor 421; a reduction gear (not shown) such as a planetary gear rotatably mounted around a shaft in parallel with the axis in the easing 422 to slow down the motor 421; and an output shaft 423 which projects downward to feed reduced-speed rotation of the reduction gear. The output shaft 422 is inserted into and connected to the rotary drum 412 from above, and the lower part of the casing 422 is connected to the upper part of the casing 411, so that the drive portion 42 is connected to the driven portion 41. The drive portion 42 is connected to the driven portion 41 after the driven portion 41 is mounted to the panel P, as described later.

Then, motion of this embodiment will be described. The moving member 9 is positioned at a fully-closed position 9B when the door D is in a fully-closed position, and is positioned at a fully-open position 9A when the door D is in a fully-open position.

When the door D is in the fully-closed position, a predetermined switch is operated to open the door D and the motor 421 is normally rotated. The normal rotation is transmitted as rotation in an opening direction to the rotary drum 412 via the reduction gear of the drive portion 42 and the output shaft 423.

When the rotary drum 412 rotates in an opening direction, the opening cable 11 is wound on the rotary drum 412, and the closing cable 10 is reeled out. The moving member 9 moves backward from the front end of the guide rail to the fully-closed position 9A. Thus, the door D is moved from the fully-closed position to the fully-open position and stops at the fully-open position.

When the door D is in the fully-open position, the switch is operated to close the door, the motor 421 rotates back, and the rotary drum 412 rotates in a closing direction opposite the opening direction, so that the opening cable 11 is reeled out and the closing cable 10 is wound up. The moving member 9 moves forward from the rear end of the center guide rail 2 to the fully-closed position. Thus, the door D moves from the fully-open position to the fully-closed position and stops.

When the door is in the fully-closed position or when the center guide rail is exposed, the closing cable 10 which moves along the lower surface of the center guide rail 2 is wound on the rotary drum 412 and around the front reversible pulley 5 under the center guide rail 2 connected to the moving member 9. Hence, the closing cable 10 is not exposed. The closing cable 10 does not come into passenger's view, thereby improving appearance and preventing dust from sticking to the closing cable 10. Meanwhile, the opening cable 11 is reeled off the rotary drum 412 and exposed on the upper surface of the center guide rail 2, but is covered with the finisher 132. So the opening cable 11 does not come into passenger's view. Even when the center guide rail 2 is exposed, the closing cable 10 and opening cable 11 do not appear, thereby improving appearance.

Figure 7:
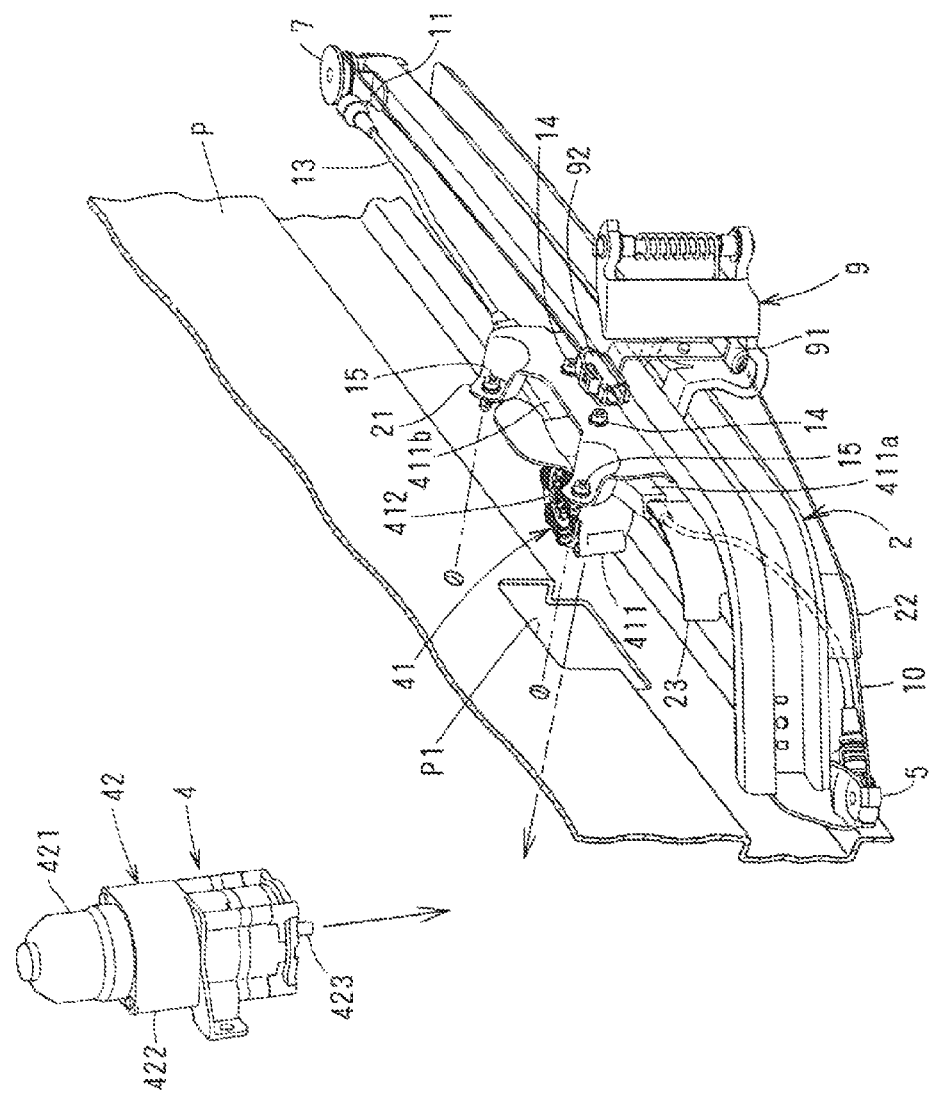
FIG. 7 is a perspective view for explaining how to connect the rail module and the drive portion to a vehicle body.

In FIGS. 2 and 7, before the step for fixing the panel P to the center guide rail 2 while the drive portion 42 is separated from the driven portion 41, the closing cable 10 and opening cable 11 which come from the closing-cable outlet 411a and opening-cable outlet 411b of the driven portion 41 respectively are wound on the front reversible pulley 5 and rear reversible pulley 7 and coupled to the closing coupling portion 91 and opening coupling portion 92 of the moving member 3 to constitute a rail module comprising the center guide rail 2, closing cable 10, opening cable 11 and driven portion 41.

The driven portion 41 of the rail module is inserted into the opening P1 from the outside of the panel P, and the bracket 21 formerly fixed to the casing 411 of the driven portion 41 is fixed to the panel P with the bolt 15. Then, the center guide rail 2 is fixed to the panel P with a plurality of bolts. All elements except the drive portion 42 are connected to the vehicle body B.

Then, the drive portion 42 is connected from the interior of the vehicle to the driven portion 41 introduced into the opening P1 of the panel P from the exterior to the interior of the vehicle. The output shaft 423 of the drive portion 42 is connected to rotate together with the rotary drum 412 enabling rotation of the motor 421 to be transmitted to each of the cables 10, 11.

In the embodiment of a vehicle door opening device according to the present invention, the driven portion 41 is divided from the drive portion 42 in the door-opening drive unit 4, and the opening P1 through which the driven portion 41 is introduced into the panel P from the outside to the inside of the vehicle is formed. Each of the cables 10, 11 reeled out of the driven portion 41 is coupled to each of the coupling portions 91, 92 of the moving member 9 movably connected to the center guide rail 2 to constitute a rail module. The driven portion 41 of the rail module is connected from the outside of the vehicle to the panel P with the center guide rail 2, and then the drive portion 42 is connected to the driven portion 41 from the inside of the vehicle thereby reducing assembling time of each part to the vehicle body B on the vehicle assembling line.

The opening P1 of the panel P may be size enough so that the only driven portion 41 can be introduced through the opening P1 without the motor 421 in the door-opening drive unit 4. So adverse effect to rigidity of the panel P can be kept at minimum.

Due to the rail module comprising the center guide rail 2, closing cable 10, opening cable 11 and driven portion 41, the cables 10, 11 are connected to the moving member 9 more efficiently before the center guide rail 2 is fixed to the panel P, thereby keeping down damage to the cables 10, 11 at the minimum during assembling to the vehicle body B.

The coupling portions 91, 92 of the moving member 9 coupled to the cables 10, 11 respectively are spaced perpendicular to a moving direction of the moving member 9 or not across the moving member 9 from each other. Compared with the structure in which the coupling portion is across the other coupling portion in the prior art, the present invention can reduce the size along the moving direction of the moving member 9 and increases stroke of the moving member 9 and opening/closing stroke of the door D.

Furthermore, the rear reversible pulley 7 is located on the upper surface of the center guide rail 2, and the opening coupling portion 92 is provided on the upper part of the moving member 9. The opening cable 11 can move along the upper surface of the center guide rail 2. The opening cable 11 is not seen by a passenger when the door D is closing, thereby improving its appearance and preventing mischief to the opening cable 11.

The front reversible pulley 5 and rear reversible pulley 7 are disposed at the lower side and upper side respectively, and there is no obstacle on a moving path of the moving member 9, thereby increasing opening/closing stroke of the door D.

The foregoing relates to an embodiment of the invention. Various modifications and changes may be made as below without departing from the gist of the invention.

(i) The closing reversible member 5 and/or opening reversible member 7 do not rotate.

(ii) The closing reversible member 5 is located on the upper surface at the front end of the center guide rail 2, and the opening reversible member 7 is located under the rear end of the center guide rail 2. The closing coupling portion 91 is provided at the upper part of the moving member 9, and the opening coupling portion 92 is provided at the lower part of the moving member 9. However, when the door is fully closed, the advantage that the opening cable 11 is not seen by the passenger is not gained.

What is claimed is:

1. A vehicle door opening device in which a door is supported on a vehicle body of a vehicle to open and close with a motor, the device comprising:
   a center guide rail fixed to the vehicle body;
   a moving member supported on the center guide rail to move and connected to the door, the moving member comprising a closing coupling portion and an opening coupling portion on a lower part and an upper part of the moving member respectively;
   a closing reversible pulley disposed under a lower surface at a first end of the center guide rail,
   an opening reversible pulley disposed on a top surface at a second end of the center guide rail;
   a closing cable wound around the closing reversible pulley and coupled to the closing coupling portion of the moving member, wherein the closing cable moves along the lower surface of the center guide rail to transmit rotation of the motor to the moving member as a door-closing force;
   an opening cable wound around the opening reversible pulley and coupled to the opening coupling portion of the moving member; wherein the opening cable moves above an uppermost top surface of the center guide rail along the center guide rail to transmit rotation of the motor to the moving member as a door-opening force and whereby the opening cable does not appear to an exterior of the vehicle;
   a lower arcuate guide member that is fixed on a lower part of the center guide rail and guides the closing cable longitudinally in sliding contact therewith; and
   an upper arcuate guide member that is fixed on an upper part of the center guide rail and guides the opening cable longitudinally in sliding contact therewith.

2. The vehicle door opening device of claim 1 wherein the closing coupling portion and the opening coupling portion have a tensioner for giving tension to the closing cable and the opening cable respectively.

3. The vehicle door opening device of claim 1 wherein the door is a sliding door in the vehicle.

4. The vehicle door opening device of claim 1 whereby a finisher covers the top surface of the center guide rail, thereby hiding the opening cable from view from the exterior of the vehicle and preventing the opening cable from being touched from the exterior of the vehicle.

\* \* \* \* \*